US005158642A

United States Patent [19]

Koike

[11] Patent Number: 5,158,642

[45] Date of Patent: Oct. 27, 1992

[54] LABEL SEPARATOR APPARATUS

[75] Inventor: Seiji Koike, Shizuoka, Japan

[73] Assignee: Tokyo Electric Co., Ltd., Tokyo, Japan

[21] Appl. No.: 504,922

[22] Filed: Apr. 5, 1990

[30] Foreign Application Priority Data

Oct. 12, 1988 [JP] Japan ............................... 63-133122

[51] Int. Cl.[5] .......................... B32B 35/00; B65H 5/28

[52] U.S. Cl. ....................................... 156/584; 221/73; 226/169; 226/184

[58] Field of Search ............... 156/541, 540, 542, 584; 221/71, 73; 248/215, 298, 477, 496; 226/3, 12, 15, 83, 89, 90, 91, 169, 184

[56] References Cited

U.S. PATENT DOCUMENTS

| | | | |
|---|---|---|---|
| 2,696,962 | 12/1954 | Goss | 248/477 |
| 3,132,788 | 5/1964 | Johnson | 226/184 |
| 3,294,330 | 5/1963 | Whiteley | 226/184 X |
| 3,696,967 | 10/1972 | Moore et al. | 221/73 |
| 3,698,600 | 10/1972 | Foote | 221/73 X |
| 4,059,203 | 11/1977 | Wright | 221/73 |
| 4,173,510 | 11/1979 | Tobey | 156/584 |
| 4,189,337 | 2/1980 | Higgins et al. | 156/541 X |
| 4,203,175 | 5/1980 | Heine | 248/215 X |
| 4,869,775 | 9/1989 | Quittner | 156/542 |

FOREIGN PATENT DOCUMENTS

| | | |
|---|---|---|
| 1491392 | 8/1967 | France . |
| 61-266277 | 11/1986 | Japan . |

OTHER PUBLICATIONS

Robotic Tool for the Application of Non-Rigid, Adhesive-Backed Parts, J. C. Colson, IBM Technical Disclosure Bulletin, vol. 26, No. 9, Feb. 1984, pp. 4678–4679.

*Primary Examiner*—Michael W. Ball
*Assistant Examiner*—Mark A. Osele
*Attorney, Agent, or Firm*—Frishauf, Holtz, Goodman & Woodward

[57] ABSTRACT

A label separator apparatus has a label separating member for separating labels one by one from a long and narrow label carrying paper, on which the labels are adhered, by acutely turning the carrying paper toward a no-label-adhered side thereof while the carrying paper is moved in its longitudinal direction. The label separator apparatus further has a label-rising restrictor located above the label being separated form the paper which contacts a rear end portion of the label which is being separated while the label rises together with the paper from the separating member, so that the label is prevented from being completely separated from the paper.

12 Claims, 2 Drawing Sheets

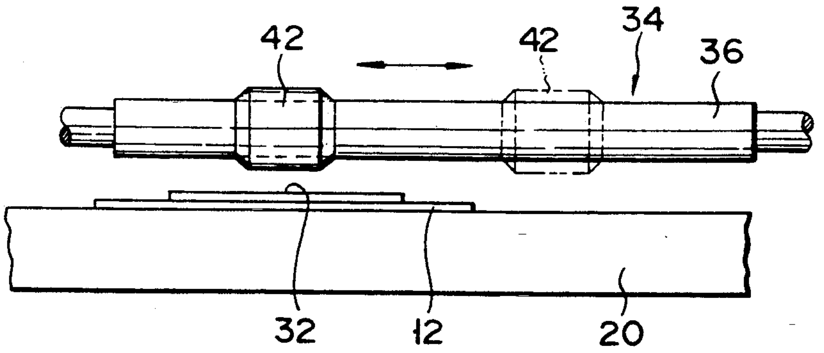
FIG. 3
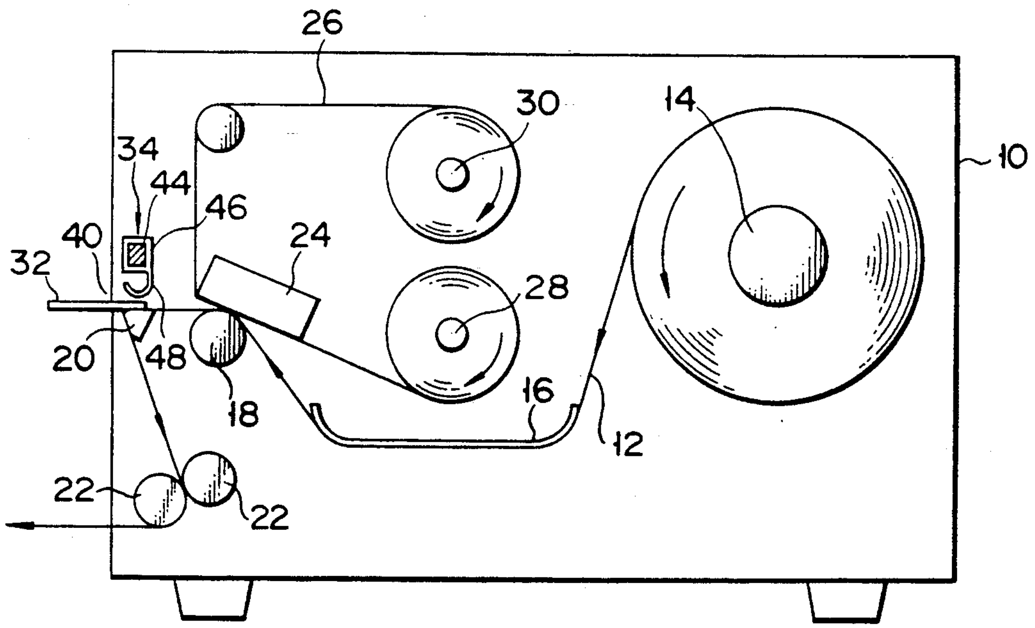
FIG. 4
FIG. 5
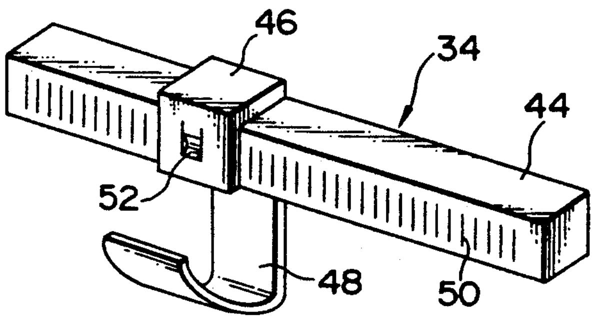

LABEL SEPARATOR APPARATUS

BACKGROUND OF THE INVENTION

1. Field of the Invention

This invention relates to a label separator apparatus for separating labels from a label carrying paper on which the labels are adhered, and more particularly it relates to a label separator apparatus of the type that separates labels one by one from a long and narrow label carrying paper on which a plurality of labels are adhered, by acutely turning the carrying paper toward its back side (no label adhering side) by means of a label separating member while the carrying paper is moved in its longitudinal direction by means of a label carrying paper moving means.

2. Description of the Related Art

A thermal transfer printer provided with a label separator apparatus of the above described type is disclosed in Published and unexamined Japanese Patent Application No. 61-266277. With this known thermal transfer printer, ink is transferred for printing from an ink ribbon onto labels adhered on a long and narrow label carrying paper by means of a thermal head in accordance with given printing signals while the label carrying paper is being moved in a longitudinal direction. The carrying paper is moved further forward and eventually turned acutely toward the back side (no label adhering side), and the labels that have been printed are separated from the carrying paper one by one at the acutely turned position.

Printed label sensing means using, for example, a light transmission type optical sensor or a light reflection type optical sensor is mounted at a printed label discharge opening of the printer, and the movement of the carrying paper is stopped when the printed label sensing means senses the rear end of the printed label while the printed label is separating. When the movement of the carrying paper is stopped, the printed label has been separated from the carrying paper except the rear end portion thereof, and the front most region in the separated part of the printed label projects out from the printed label discharge opening.

Therefore, since the printed label projected out from the printer is adhered only at its rear end portion on the carrying paper located on the label separating member, a user of the printer can perfectly separate the projected and printed label from the carrying paper by pinching the outer end of the separated portion of the printed label, which is projected out from the printed label discharge opening, and lightly pulling the outer end.

In the conventional label separator apparatus constructed as described above, the printed label projected out from the printed label discharge opening tends to perfectly separate from the carrying paper by losing its weight balance owing to the weight of the separated portion thereof, by being winded on the separated portion, or by being applied on the label separator with a vibration, because the printed label projected out from the printed label discharge opening is adhered only at its rear end portion on the carrying paper. And, such tendency is particularly large in the labels which are elongated in the moving direction of the carrying paper.

The printed label, which is completely separated from the carrying paper and falls on a floor, cannot be used.

The housing of the above described thermal transfer printer is constructed of upper and lower half housing members, and the upper housing member is pivotally attached at its one side end to the lower housing member. By pivoting upward the upper housing member around the one side end, a new label carrying paper, which is wound like a roll, can be supplied in a label-carrying-paper receiving hollow mounted in the lower housing member.

In the thermal transfer printer having such an upper and lower two split type housing, a relatively large power is needed to rotate upwardly the upper half housing member because various members are mounted in the upper half housing member similarly to the lower half housing member so that the weight of the upper half housing member is relatively heavy.

Therefore, for people of low strength it is hard to supply a new roll of label carrying paper in the label-carrying-paper receiving hollow of the lower housing member.

In order to make easier the supply work of the new roll of label carrying paper, housings have recently been constructed not to be of the upper and lower two split type, but to have a door on one side surface of the housing, the door being used for the supply work of the new roll of label carrying paper.

SUMMARY OF THE INVENTION

In view of the above described problems, it is therefore the object of the present invention to provide a label separator apparatus which can prevent a long and narrow printed label, elongated in the moving direction of a label carrying paper, from completely separating from the carrying paper as caused by its own weight by or unexpected causes such as wind, vibration and the like, and from being thereby unusable when the printed label is adhered only at its rear end portion on a carrying paper located on a label separating member with the greatest region of the separated part of the printed label being projected out from a printed label discharge opening of a printer. The present invention has a simple construction and its handling is easy, and is preferably to be used in a label printing apparatus such as a thermal transfer printer, the apparatus being so constructed that it allows a supply of rolled new label carrying paper to a label-carrying-paper receiving hollow of an apparatus housing through one side surface of the housing and provide the above described advantages.

According to the invention, the above object is achieved by providing a label separator apparatus comprising: a label carrying paper moving means for moving a long and narrow label carrying paper, on which a plurality of labels are adhered, in its longitudinal direction; a label separating member for separating labels one by one from the label carrying paper by acutely turning the label carrying paper toward one side surface thereof on which no labels are adhered as the label carrying paper is being moved by means of the label carrying paper moving means; and a label-rising restrictor (hereinafter alternatively referred to as a suppressor) which is mounted at a position located above the label separating member and away from the label being separated from the label carrying paper, and which contacts a rear end portion of the label in the carrying paper moving direction while the label being separated from the label carrying paper if a portion of the label, which has not passed over the acutely turned position of the label carrying paper while the label being separated, rises together with the label carrying paper from the label separating member, thereby the not-passed portion of the label being prevented from being separated from the label carrying paper and the label being prevented from being away from the label carrying paper, a portion of the label-rising suppressor which does not oppose the label above the label separating member being further away from the label than the other portion of the label-rising suppressor which opposes the label above the label separating member.

The above described label-rising suppressor surely prevents a printed long and narrow label elongated in a label-carrying-paper moving direction from being completely separated from the label carrying paper owing to its own weight or unexpected cause such as wind, vibration and the like, and from being thereby unusable when the printed label is adhered only at its rear end portion on the carrying paper located on the label separating member with the greatest region of the separated part of the printed label being projected out from a printed label discharge opening of a printer. The label-rising suppressor is accordingly simple in construction and is easily handled.

The above described label-rising suppressor venders the label separator apparatus to be preferably used in a label printing apparatus such as a thermal transfer printer, the apparatus being so constructed that it allows a supply of rolled new label carrying paper to a label-carrying-paper receiving hollow of an apparatus housing through one side surface of the housing, because the label-rising suppressor is so constructed that it contacts a rear end portion of the label in the carrying paper moving direction while the label being separated from the label carryingpaper if a portion of the label, which has not passed over the acutely turned position of the label carrying paper while the label being separated, rises together with the label carrying paper from the label separating member, and a portion of the label-rising suppressor which does not oppose the label above the label separating member is further away from the label than the other portion of the label-rising suppressor which opposes the label above the label separating member.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specifications, illustrate presently preferred embodiments of the invention, and together with the general description given above and the detailed description of the preferred embodiments given below, serve to explain the principles of the invention.

FIG. 3 is an enlarged front view schematically illustrating the label separating member and a first variation of the label-rising suppressor; and FIG. 4 is a longitudinal sectional view schematically illustrating a main portion of a label or ticket issuing machine as a thermal printer provided with the preferred embodiment of the label separator apparatus of the invention, the apparatus being provided with a second variation of the label-rising suppressor; and FIG. 5 is an enlarged perspective view illustrating a second variation of the label-rising suppressor.

Now the invention will be described in detail by referring to the accompanying drawings that illustrate a preferred embodiment of the invention as well as variations of the label-rising suppressor.

DETAILED DESCRIPTION OF THE PREFERRED EMBODIMENTS

Figure 1:
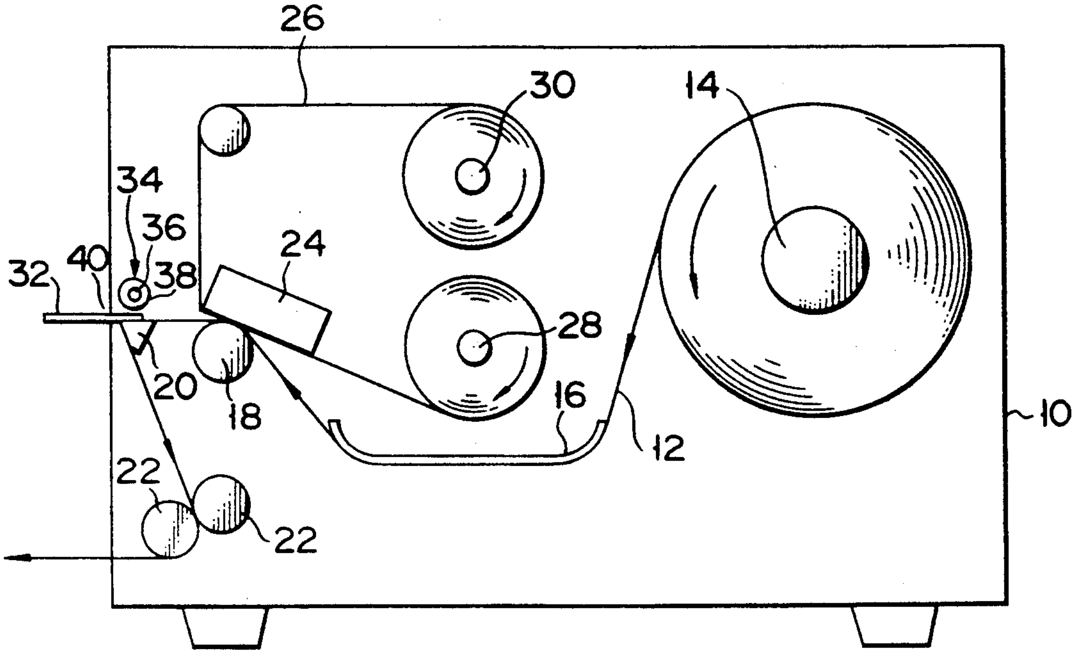
FIG. 1 is a longitudinal sectional view schematically illustrating a main portion of a label or ticket issuing machine as a thermal printer provided with a preferred embodiment of a label separator apparatus of the invention.

In FIG. 1, a longitudinal section of a main part of a label or ticket issuing machine as a thermal printer provided with a preferred embodiment of the label separator apparatus of the invention is schematically illustrated. A label-carrying-paper receiving section 14 for rotatably receiving a rolled long and narrow label carrying paper 12, on which a large number of labels or tickets (one kind of label) are adhered along the longitudinal direction of the carrying paper, is mounted at one end portion in the interior of a housing 10 of the issuing machine. The rolled carrying paper 12 is unwound from the receiving section 14 with carrying labels or tickets on its upper surface and is guided by way of a guide panel 16 and a platen roller 18 toward a label or ticket separating member 20 provided at the other end portion in the interior of the housing 10 (A ticket is considered as one kind of label, so that the label or ticket separating member will be disclosed only as the label separating member in the following description). Then, the carrying paper 12 is further guided to a pair of carrying paper drive rollers 22 arranged below the label separating member 20 in the housing 10 and, after passing through the paired carrying paper drive rollers 22, the carrying paper 12 is led to the outside of the housing.

The label separating member 20 is shaped as a rod having a triangular cross section, and is arranged to extend in the width direction of the carrying paper 12. The label carrying paper 12 is acutely turned backward, or to the no-label adhering side, by the label separating member 20 so as to be orientated toward the paired carrying paper drive rollers 22.

A drive motor (not shown) is connected to the paired drive rollers 22, and a leading end of the rolled carrying paper 12 is led out from the carrying paper receiving section 14 as the paired carrying paper drive rollers 22 are driven by the drive motor (not shown), so that the carrying paper 12 proceeds by way of the guide panel 16, the platen roller 18 and the paired carrying paper drive rollers 22 and is discharged from the lower end portion of the other end surface of the housing 10.

Within the housing 10, a thermal head 24 is arranged so as to oppose to the carrying paper 12 located on the platen roller 18. The thermal head 24 indirectly contacts the label or ticket on the carrying paper 12 located on the platen roller 18 with an ink ribbon 26 being interposed between the thermal head 24 and the label or ticket on the carrying paper 12.

Both ends of the ink ribbon 26 are fixed and wound around an ink ribbon supply reel 28 and an ink ribbon take-up reel 30. The ink ribbon 26 is moved from the supply reel 28 to the take-up reel 30 in correspondence with the movement of the carrying paper 12, and moves in the same direction as the carrying paper 12 moves between the thermal head 24 and the platen roller 18.

While the carrying paper 12 and the ink ribbon 26 move as described above, the thermal head 24 transfers the ink from the ink ribbon 26 to a label or ticket in accordance with the printing signal transmitted from a control means (not shown) to print specific information on the label or ticket.

The printed label or ticket 32 is then separated from the carrying paper 12 as the carrying paper 12 is acutely turned backward (or to the side surface without adhered labels) by the label separating member 20, and is projected out from the housing 10 through a label or ticket discharge opening 40 formed on the other side surface of the housing so as to oppose the label separating member 20.

At the label or ticket discharge opening 40 of the housing 10, a printed label sensing means (not shown) which uses such as a light transmission type or light reflection type optical sensor is mounted. By sensing the rear or trailing end of the printed label or ticket 32 with the printed label sensing means while the printed label or ticket is separating from the carrying paper 12, the movement of the carrying member 12 is stopped. When the movement of the carrying member 12 is stopped, the printed label or ticket 32 has already separated from the carrying paper 12 except the rear or trailing end portion of the label or ticket 32, and the most forward region of the separated part of the printed label or ticket 32 projects out the housing 10 through the label or ticket discharge opening 40.

Therefore, since the printed label or ticket 32 is adhered only at its rear end portion on the carrying paper 12 located on the label separating member 20, an user of the printer can completely separate the printed label or ticket 32 from the carrying paper 12 by pinching the outer end of the separated portion of the printed label or ticket 32 projected out through the printed label or ticket discharge opening 40, and by pulling it.

In the above described embodiment, a roller-shaped label or ticket-rising restrictor (alternatively referred to as a suppressor) 34 is arranged so as to oppose the printed label or ticket 32 (the label or ticket-rising suppressor 34 will be described only as the label-rising suppressor 34, by the same reason as in the case of the label separating member 20). As illustrated in particular detail in FIG. 2, the label-rising suppressor 34 includes a center shaft 36 which extends in a direction substantially perpendicular to the moving direction of the carrying paper 12 and is arranged in parallel with the upper surface of the carrying paper 12, and a substantially barrel or spindle shaped label-rising suppressing roller 38 which is coaxially and rotably arranged on the center shaft 36.

The label-rising suppressing roller 38 has a cylindrical label-rising suppressing body 38*a* located at a substantial center in the longitudinal direction of the center shaft 36 and being approximately 15 to 20 mm long in its axial direction, and a pair of tapered portions 38*b* located at the longitudinal both ends of the body 38 so as to orient the smaller diameter ends thereof in the opposite direction.

Figure 2:
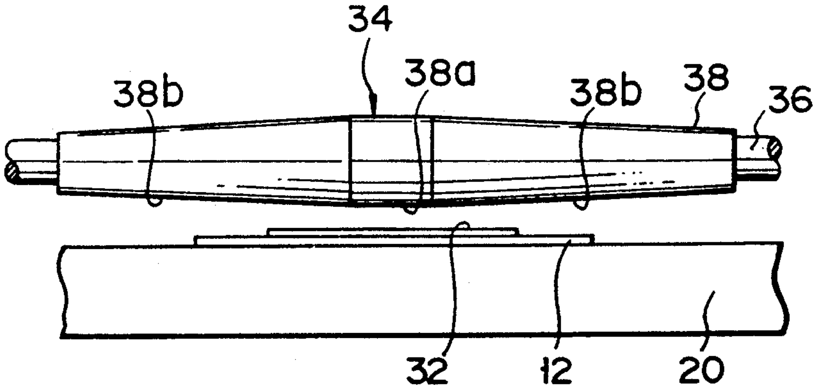
FIG. 2 is an enlarged front view schematically illustrating a label-rising suppressor and a label separating member of a label separator apparatus provided in the label or ticket issuing machine of FIG. 1.

As shown in FIG. 2, cylindrical label-rising suppressing body 38*a* is located spaced above the upper surface of the printed label 32 on the carrying paper 12 laid on the label separating member 20 by approximately 0.5 mm. Therefore, the label-suppressing body 38*a* usually does not contact the printed label or ticket 32 (as shown in FIG. 2) but is separated from the label separating member 20 while the carrying paper 12 is moved, and also usually does not contact the printed label or ticket 32 projected unsupported out through the label or ticket discharge opening 40 with only the rear end portion of the printed label or ticket 32 being adhered on the carrying paper 12 laid on the label separating member 20 while the movement of the carrying paper 12 is stopped.

However, a portion of the printed label or ticket 32, which has been separated from the carrying paper and is projected out from the housing 10, tends to hang by the weight of its self, and this tendency becomes lager as the dimension of the label or ticket 32 on the carrying paper 12 becomes larger in the moving direction of the carrying paper 12.

If a portion of the printed label or ticket 32 laid on the label separating member 20, that portion being located backward from the carrying paper acutely turned position on the label separating member 20, is risen up together with the carrying paper 12 from the label separating member 20 by the above described hanging down caused by the weight of its self, by the wind on the outer projected portion of the printed and mostly separated label or ticket 32, or by the vibration applied to the thermal transfer printer, the label-rising suppressing body 38*a* contacts the unseparated portion of the printed and risen label or ticket 32.

Since the above described contact is performed in the above described case, the printed label or ticket 32 is prevented from being completely separated at the unseparated portion thereof from the carrying paper 12 while the printed label or ticket 32 is being separated.

That is to say, the printed label or ticket 32, projected out through the label or ticket discharge opening 40 with only the rear end portion of the printed label or ticket 32 being adhered on the carrying paper 12 when the movement of the carrying paper 12 has been stopped, surely keeps the above described state until it is completely separated from the carrying paper by the user of the printer.

In the above described embodiment, a door (not shown) is provided on one side surface of the housing 10, so that a new rolled carrying paper 12 can be supplied to the carrying paper receiving section 14 in the housing through the one side surface of the housing 10 by opening the door.

When the rolled new carrying paper 12 is supplied to the carrying paper receiving section 14, a led-out piece of the carrying paper 12 which has been led out from the rolled new carrying paper 12 must be guided sideways to the under surface of the guide panel 16, between the platen roller 18 and the thermal head 24, between the label separating member 20 and the label-rising suppressor 34, and between the paired carrying paper drive rollers 22. However, since the label-rising suppressing roller 38 of the label-rising suppressor 34 is formed as the substantially barrel or spindle shape, it is easy to lead the above described led-out piece of the carrying paper 12 into a clearance between the label-rising suppressor 34 and the label separating member 20.

FIG. 3 schematically illustrates a first variation of the label-rising suppressor 34. In FIG. 3, the components which are similar to those illustrated in FIG. 1 are indicated by the same reference numerals and will not be described any further.

This first variation of the label-rising suppressor 34 has a cylindrical label-rising suppressing roller 42 arranged coaxially on a center shaft 36. Like the cylindrical label-rising suppressing body 38*a* of the substantially barrel o spindle shaped label-rising suppressor 34 of the above described embodiment, the label-rising suppressing roller 42 has a length of between about 15 mm and about 20 mm and, as shown in FIG. 3 by a solid line, is located above the upper surface of the printed label or ticket 32 on the carrying paper 12 laid on the label separating member 20 with a clearance of approximately 0.5 mm.

This first variation of the label-rising suppressor 34 operates for the printed label or ticket 32 on the carrying paper 12 moving on the label separating member 20 in a similar manner as the substantially barrel or spindle shaped label-rising suppressor 34 of the first embodiment.

However, since this first variation of the label-rising suppressor 34 is arranged on the center shaft 36 with a ring made of such a stainless steel or the like interposed therebetween, it can slide on the center shaft 36 in the longitudinal direction of the shaft 36 as illustrated by two-dot chain line in FIG. 3, and can be maintained at a desired position on the center shaft 36 (for instance, at the center in the width direction of the printed label or ticket 32 on the carrying paper 12 laid on the label separating member 20).

The label rising suppressing roller 42 which is slidable on the center shaft 36 may be temporarily moved sideways to the outside of the carrying paper laid-on portion on the label separating member 20 when a rolled new carrying paper 12 is supplied sideways to the carrying paper receiving section 14 in the housing 10. This makes the operation of placing sideways the led-out piece of the carrying paper 12 at the predetermined position on the label separating member 20 easy as in the case of the substantially barrel or spindle shaped label-rising suppressor 34 of the above described one embodiment. Once the carrying paper 12 is laid on the predetermined position on the label separating member 20, the label-rising suppressing roller 42 is moved back to the predetermined position shown by a solid line in FIG. 4 so as to oppose the substantially center of the width direction of the label or ticket 32 on the carrying paper 12 laid on the predetermined position on the separating member.

Now referring to FIGS. 4 and 5, a second variation of the label-rising suppressor will be described in detail.

In FIGS. 4 and 5, the components which are similar to those illustrated in FIG. 1 are indicated by the same reference numerals and will not be described any further.

FIG. 4 shows a main portion of a label or ticket issuing machine as a thermal transfer printer which is provided with a label separator apparatus according to one embodiment of the invention, in the thermal transfer printer a second variation of the label-rising suppressor being mounted.

The second variation of the label-rising suppressor 34 comprises a support beam 44, which has a square rod shape and is located at a position opposing to the carrying paper 12 on the label separating member 20 so as to extend substantially perpendicularly to the moving direction of the carrying paper 12 and in parallel with the upper surface of the carrying paper 12, and a movable member 46, which is arranged on the support beam 44 in such a manner that can move on the support beam 44 in its longitudinal direction. An opposing member 48, which is projecting downward toward the carrying paper 12 located on the label separating member 20, and which is curved forward toward the label or ticket discharge opening 40 of the housing 10 so as to have a substantially J-shaped cross section, is mounted on the movable member 46.

A plurality of engaging projections 50 are formed on a plurality of positions on the surface of the support beam 44, and the positions are separated from each other with regular intervals in the longitudinal direction. The movable member 46 is provided with an elastic engaging pawl 52 that is selectively engaged with one of the engaging projections 50. In this variation, the elastic engaging pawl 52 may be integrally formed with the movable member 46 by using an elastic material such as plastic or metal so that the engaging pawl 52 has an elasticity.

The opposing member 48 is selectively movable on the support beam 44 in its longitudinal direction and can be selectively fixed at a desired position on the support beam 44 due to the operation of the elastic engaging pawl 52 of the movable member 46 to the engaging projections 50 of the support beam 44.

The lower end of the opposing member 48 is upwardly separated from the upper surface of the printed label or ticket 32 on the carrying paper 12 located on the label separating member 20 by a distance of approximately 0.5 mm.

The above described second variation of the label-rising suppressor 34 operates for the printed label or ticket 32 on the carrying paper 12 located on the label separating member 20 in a similar manner as the substantially barrel or spindle shaped label-rising suppressor 34 of the first embodiment and the short and cylindrical label-rising suppressor 34 of the first variation.

However, since this second variation of the label-rising suppressor 34 is movable on the support beam 44 in its longitudinal direction, it may be temporarily moved sideways to the outside of the carrying paper laid-on portion on the label separating member 20 when a rolled new carrying paper 12 is supplied sideways to the carrying paper receiving section 14 in the housing 10 as in the case of the label-rising suppressing roller 4 of the first variation. This makes the operation of placing sideways the led-out piece of the carrying paper 12 at the predetermined position on the label separating member 20 easy as in the case of the label-rising suppressor 34 of the first embodiment or that of the first variation. Once the led-out piece is placed at the predetermined position on the label separating member 20, the movable member 46 is moved on the support beam 44 so that the opposing member 48 is moved to the predetermined position at which the member 48 opposes the center of the width direction of the label or ticket on the carrying paper 12 placed at the predetermined position on the separating member 20.

It may be needless to say that the above described embodiment and variations are presented here to make the present invention easy to understood and they are not by any means intended to limit the scope of the invention. Therefore, various variations and modifications may be made to the present invention without departing the scope and the spirit of the invention.

For instance, the printing unit of the label or ticket issuing machine provided with a label separator apparatus of the one embodiment of the invention, the separation apparatus having a level-rising suppressor, may be replaced by a dot impact type printing unit.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A label separator apparatus comprising:

a label carrying paper moving means for moving a long and narrow label carrying paper in a longitudinal direction thereof, the label carrying paper having on a first side surface thereof a plurality of labels adhered along the longitudinal direction, the label carrying paper being mountable to and dismountable from the moving means in a width direction thereof;

a fixed straight label separating member, extending straight in said width direction of the label carrying paper, for separating labels one by one from the label carrying paper by acutely turning the label carrying paper toward a second side surface thereof on which no labels are adhered as the label carrying paper is moved in its longitudinal direction by means of the label carrying paper moving means; and a label-rising restrictor, fixedly mounted to oppose a trailing end portion of a label located on the label separating member with a predetermined gap between the trailing end portion and the restrictor when a leading end portion of the label has passed the label separating member and is separated from the label carrying paper and the trailing end portion thereof remains adhered to the label carrying paper;

said label-rising restrictor being immovable away from the trailing end portion of the label in a direction perpendicular to the first side surface the leading end portion of the label being projected unsupported;

said label-rising restrictor contacting the trailing end portion of the label only when the trailing end of the label rises together with the label carrying paper from the label separating member through the predetermined gap, the trailing end portion of the label thereby being prevented from being separated from the label carrying paper;

a gap between a portion of the label-rising restrictor which does not directly oppose the trailing end portion of the label on the label separating member and the label separating member being larger than a gap between another portion of the label-rising restrictor which directly opposes the label on the label separating member and the label separating member; and said label-rising restrictor including a cylindrical portion directly opposed to the trailing end portion of the label located on the label separating member and a pair of tapered portions located at longitudinally opposite ends of the cylindrical portion so as to orient smaller diameter ends thereof in opposite directions.

2. A label separator apparatus according to claim 1, wherein said label-rising restrictor has a substantially barrel shape and has a longitudinal center line which extends in a direction substantially perpendicularly to the moving direction of said label carrying paper.

3. A label separator apparatus according to claim 2, wherein said label-rising restrictor is freely rotatable around the longitudinal center line thereof.

4. A label separator apparatus according to claim 1, wherein said label-rising restrictor includes:

a support beam extending in a direction perpendicular to the moving direction of the label carrying paper; and a label-rising suppressing body mounted on the support beam so as to be selectively movable in the longitudinal direction of the support beam, said label-rising suppressing body having a dimension in the width direction of said label carrying paper which is smaller than that of the labels on said label carrying paper.

5. A label separator apparatus according to claim 4, wherein said support beam and said label-rising suppressing body are both substantially circular in cross-section, and said label-rising suppressing body is coaxially arranged on said support beam.

6. A label separator apparatus according to claim 5, wherein said label-rising suppressing body is rotatable on said support beam.

7. A label separator apparatus according to claim 4, wherein said support beam is polygonal in section with three or more corners, and said label-rising suppressing body includes a movable member which is mounted on said support beam so as to be selectively movable in the longitudinal direction of said support beam, and an opposing member which projects from the movable member toward the label carrying paper and opposes the trailing end portion of the printed label on the label carrying paper on the label separating member.

8. A label separator apparatus according to claim 7, wherein:

said support beam is provided on its surface with a plurality of engaging projections; and said movable member is provided with an elastic engaging means for selectively engaging the plurality of engaging projections on the surface of said support beam.

9. A label separator apparatus according to claim 7, wherein:

said support beam is provided on its surface with a plurality of engaging indentations; and said movable member is provided with an elastic engaging means for selectively engaging the plurality of engaging indentations on the surface of said support beam.

10. A label separator apparatus according to claim 1, wherein said label-rising restrictor has a substantially spindle shape and has a longitudinal center line which extends in a direction substantially perpendicularly to the moving direction of said label carrying paper.

11. A label separator apparatus according to claim 10, wherein said label-rising restrictor includes:

a cylindrical portion directly opposed to the trailing end portion of the label located on the label separating member; and a pair of tapered portions located at the longitudinal opposite ends of the cylindrical portion so as to orient smaller diameter ends thereof in opposite directions.

12. A label separator apparatus according to claim 10, wherein said label-rising restrictor is freely rotatable around the longitudinal center line thereof.

* * * * *

UNITED STATES PATENT AND TRADEMARK OFFICE

CERTIFICATE OF CORRECTION

PATENT NO. : 5,158,642

DATED : October 27, 1992

INVENTOR(S) : Seiji KOIKE

It is certified that error appears in the above-identified patent and that said Letters Patent is hereby corrected as shown below:

Title page, left column, delete the following:

"Section [30] Foreign Application Priority Data

Oct.12, 1988 [JP] Japan.....63-133122"

Signed and Sealed this

Twenty-third Day of November, 1993

*Attest:*

BRUCE LEHMAN

*Attesting Officer*

*Commissioner of Patents and Trademarks*